(12) United States Patent
Hashem et al.

(10) Patent No.: US 6,701,129 B1
(45) Date of Patent: Mar. 2, 2004

(54) RECEIVER BASED ADAPTIVE MODULATION SCHEME

(75) Inventors: Bassam M. Hashem, Nepean (CA); Shalini S. Periyalwar, Ottawa (CA); David G. Steer, Nepean (CA)

(73) Assignee: Nortel Networks Limited, St. Laurent (CA)

(*) Notice: Subject to any disclaimer, the term of this patent is extended or adjusted under 35 U.S.C. 154(b) by 647 days.

(21) Appl. No.: 09/670,342

(22) Filed: Sep. 27, 2000

(51) Int. Cl.[7] .......................... H04B 17/00; H04Q 7/20; H04J 3/22
(52) U.S. Cl. ................ 455/67.11; 455/422.1; 455/423; 455/69; 375/225; 370/468
(58) Field of Search ................ 455/422.1, 423, 455/67.11, 63.1, 69, 72, 73, 466, 522; 375/225, 242, 222, 377; 370/468, 347, 442, 914

(56) References Cited

U.S. PATENT DOCUMENTS

| | | | | |
|---|---|---|---|---|
| 5,465,398 A | * | 11/1995 | Flammer | 455/69 |
| 5,974,106 A | * | 10/1999 | Dupont et al. | 375/377 |
| 6,452,941 B1 | * | 9/2002 | Bruhn | 370/468 |
| 6,519,236 B1 | * | 2/2003 | Haartsen | 370/522 |
| 6,529,730 B1 | * | 3/2003 | Komaili et al. | 455/422.1 |

OTHER PUBLICATIONS

Jack H. Winters, "Smart Antennas for Wireless Systems", IEEE Personal Communications, pp. 23–27, Feb. 1998.
Agrogyaswami J. Paulraj, et al. "Space–Time Modems for Wireless Personal Communication", IEEE Personal Communicaitons, pp. 36–47, Feb. 1998.

* cited by examiner

Primary Examiner—Duc M. Nguyen

(57) ABSTRACT

A method is provided for adapting modulation schemes to changing channel quality with reduced overhead signalling. A remote unit measures the channel quality of a radio channel along which a signal from a base station reached the remote unit. Based on the channel quality, the remote unit determines a desired set of transmission parameters from a list of sets of transmission parameters. The remote unit determines a difference in position within the list between the current set of transmission parameters and the desired set of transmission parameters. The remote unit transmits the difference to the base station, which selects a new set of transmission parameters using the current set of transmission parameters and the difference. The method requires little signalling between the remote unit and the base station, and is particularly beneficial in communication systems employing many sub-carriers, such as OFDM systems.

53 Claims, 6 Drawing Sheets

| S/I (dB) | MODULATION | CODING |
|---|---|---|
| 3.1 | QPSK | 1/2 |
| 5.9 | QPSK | 3/4 |
| 7.7 | QPSK | 7/8 |
| 11.1 | 16-QAM | 2/3 |
| 13.5 | 16-QAM | 5/6 |
| 14.4 | 64-QAM | 1/2 |
| 18.0 | 64-QAM | 3/4 |
| 20.1 | 64-QAM | 7/8 |

FIG. 2

RECEIVER BASED ADAPTIVE MODULATION SCHEME

FIELD OF THE INVENTION

This invention relates to digital radio communication systems, and more particularly to efficient adaptive modulation within such systems.

BACKGROUND OF THE INVENTION

In digital radio communication systems a transmitter transmits a signal at a transmission rate to a receiver through a radio channel having channel characteristics, such as an attenuation. The data is transmitted using transmission parameters, such as a modulation level and a coding rate. The transmission rate depends on the transmission parameters. The transmission parameters are constrained by an acceptable bit error rate and by a signal to interference ratio of the signal, the latter varying in time with the channel characteristics. If the signal to interference ratio decreases, the modulation level must be reduced (for example, from 16-QAM to QPSK) or the coding rate must be improved (for example, from 3/4 to 2/3) in order to maintain the acceptable bit error rate. Either of these changes results in a lower transmission rate.

The communication system can use adaptive modulation to adjust the transmission parameters to accommodate changes in channel characteristics over time. If a change in channel characteristics results in a higher signal to interference ratio, the transmitter can increase the modulation level or decrease the coding rate in order to obtain a higher transmission rate. If a change in channel characteristics results in a lower signal to interference ratio, the transmitter can decrease the modulation level or increase the coding rate to maintain the acceptable bit error rate, albeit at the expense of a lower transmission rate.

In communication systems that implement adaptive modulation, the transmitter and the receiver must be synchronized with respect to the transmission parameters. In current communication systems the receiver determines a channel quality when the receiver receives a frame of data. The receiver may estimate, for example, the signal to interference ratio of the channel. The receiver sends a signal back to the transmitter reporting the channel quality. Using the channel quality report from the receiver, the transmitter calculates optimum transmission parameters which the transmitter will use in its next transmission of data. However, the transmitter must first send the new optimum transmission parameters to the receiver using the previous transmission parameters. The receiver receives the new optimum transmission parameters, interpreting the signal using the previous transmission parameters. When the receiver receives the next transmission of data, the receiver interprets the signal using the new optimum transmission parameters it has just received from the transmitter.

This adaptive modulation scheme requires much signalling between the receiver and the transmitter. For example, if the reported signal to interference ratio has a range of 20 dB and a resolution of 1 dB, then five bits of information are needed to describe the signal to interference ratio. The channel quality must be encoded strongly so that the transmitter will receive the correct report and calculate the transmission parameters appropriate to the quality of the channel. For a coding rate of 1/4, the number of bits which must be sent from the receiver to the transmitter rises to twenty. The transmitter must also signal the optimum transmission parameters to the receiver, which may require a further twenty bits.

In communications systems that make use of multiple antennas for transmission and reception, the transmission parameters may include adaptive antenna and coding parameters. For example, some "smart antenna" systems may adaptively adjust their directional patterns towards the remote units. An outline of such systems may be found in the paper by J. H. Winters, "Smart Antennas for Wireless Systems", IEEE Pers. Commun., vol. 5, no. 1, Feb. 1998, pp 23–27, which is incorporated herein by reference. Similarly, the radio system may make use of the multiple communications channels that exist between transmitters and receivers with multiple antennas. In this case the transmission parameters include both space (across multiple antennas) and time (different time of transmissions) aspects that adapt the transmissions to the multiple propagation environment. An outline of such systems may be found in the paper by A. J. Paulraj and B. C. Ng, "Space-time Modems for Wireless Personal Communications", IEEE Pers. Commun., vol. 5, no. 1, Feb. 1998, pp. 36–48, which is incorporated herein by reference.

In radio communications systems, the transmission parameters may be adaptively adjusted to the radio channel conditions through feedback from the receiver (remote station) to the transmitter (base station). The "link mode" used by the system will consist of a set of transmission parameters that include some (or all) of: modulation scheme, error control coding scheme, symbol rate, transmission power level, antenna directional parameters, or space-time coding (STC) parameters.

In communication systems employing many sub-carriers, such as one that employs Orthogonal Frequency Division Multiplexing (OFDM), the channel quality will vary with the frequency of each sub-carrier. Information describing the channel quality and the optimum transmission parameters must be transmitted for each sub-carrier. Systems which employ OFDM can use 1000 sub-carriers, and the number of bits that must be transmitted in each direction in order to implement adaptive modulation may be 20000. This is significant overhead, and reduces the efficiency of the communication system.

SUMMARY OF THE INVENTION

The present invention provides a method of adapting a current Link Mode (LM) in a radio communication system, a LM being a set of at least one transmission parameter, such as a modulation scheme or a coding rate. The communication system includes a base station which transmits a signal to a remote unit using the current LM. A sequence of allowed LMs is stored at the base station and at the remote unit. At the remote unit a channel quality of the signal, such as a signal to interference ratio, is determined. At the remote unit, a desired LM is determined from amongst the sequence of allowed LMs based on the channel quality. At the remote unit, a sequential difference between the sequential position of the current LM and the sequential position of the desired LM is determined. The remote unit transmits the sequential difference to the base station. The remote unit sets a new current LM to be the desired LM. The base station sets a new current LM to be the desired LM using the sequential difference. The remote unit may also periodically transmit the desired LM to the base station.

The present invention also provides a method of determining a signal to interference ratio of a signal sub-carrier in a communication system. The communication system includes a base station which transmits a pilot signal to a remote unit over a pilot sub-carrier. The pilot signal may be either on or off. The remote unit measures a signal strength of the pilot sub-carrier when the pilot signal is on and measures a signal strength of the pilot sub-carrier when the pilot signal is off, the latter being in effect a measurement of interference in the pilot sub-carrier as there is no pilot signal. The remote unit calculates a ratio of the signal strength when the pilot signal is on to the signal strength when the pilot signal is off.

The method provides improved efficiency of a communication system by reducing the amount of overhead needed to adapt the transmission parameters to changing channel quality.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which:

FIG. 2 is an example of a table of Link Modes;

DETAILED DESCRIPTION OF THE PREFERRED EMBODIMENTS

Figure 1:
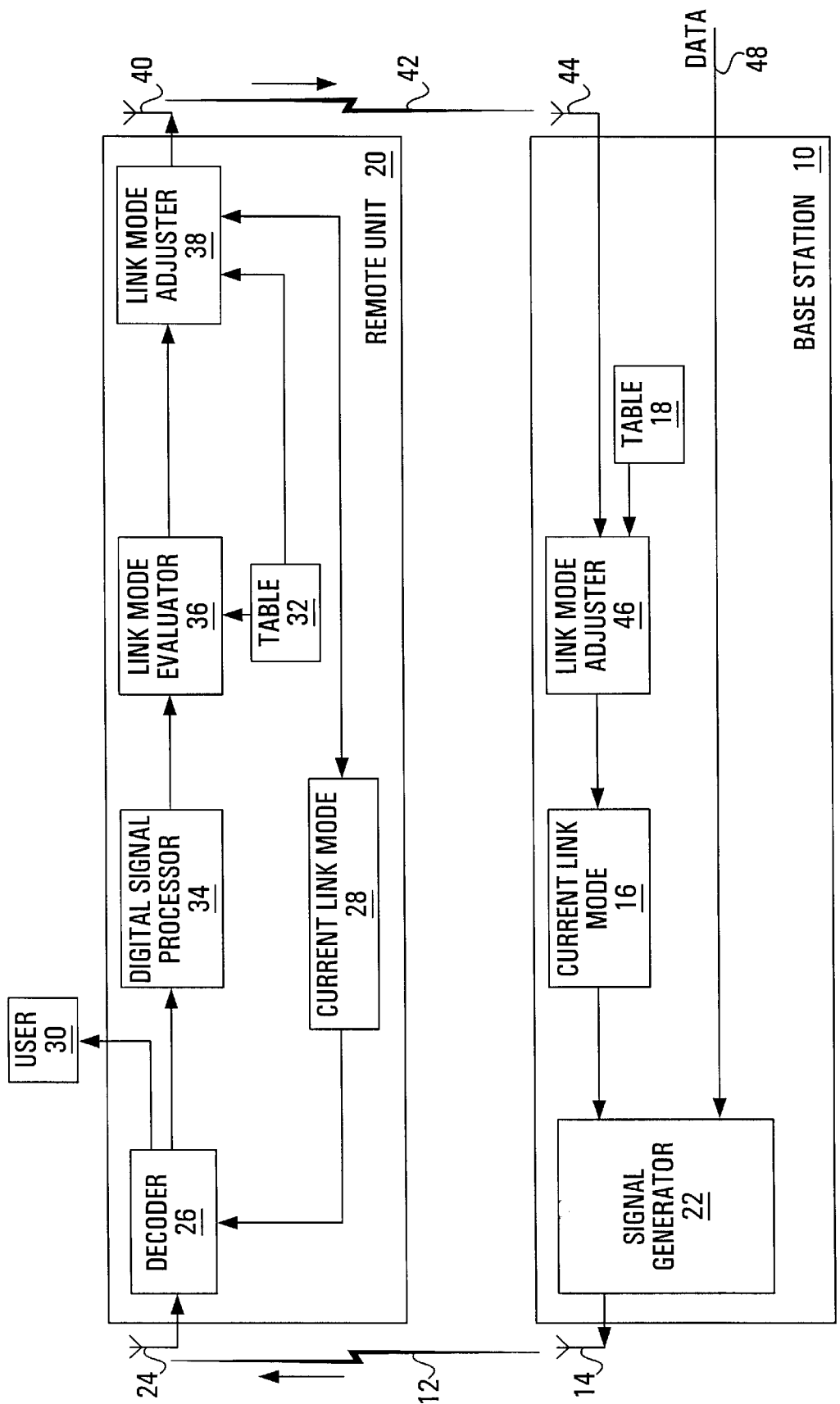
FIG. 1 is a block diagram illustrating a portion of a communication system which implements the invention.

Referring to FIG. 1, a base station 10 transmits a frame of data as a signal 12 through a base station transmitting antenna 14 to a remote unit 20 at a transmission rate. The frame is encoded by a signal generator 22 within the base station 10 using a current base station Link Mode 16. A Link Mode (LM) comprises a set of at least one transmission parameter, such as a modulation level and a coding rate. The current base station LM 16 is stored in memory either as the set of at least one transmission parameters, or as an index to a table 18 of allowed LMs. The allowed LMs are either predetermined or negotiated with the remote unit 20 when a transmission is initiated. If the frame is the first frame of a transmission, the current base station LM 16 is a default LM. Otherwise, the current base station LM 16 is the LM that was most recently set by the Link Mode adjuster 46 as described below.

The signal 12 propagates along a forward link to the remote unit 20, where it is received at a remote unit receiving antenna 24. A decoder 26 within the remote unit 20 decodes the frame using a current remote unit Link Mode 28, and the frame is then passed to a user 30. The current remote unit LM 28 is stored in memory either as a set of at least one transmission parameters, or as an index to a table 32 of allowed LMs. The allowed LMs within the table 32 within the remote unit 20 are the same as the allowed LMs within the table 18 within the base station 10. If the frame is the first frame of a transmission, the current remote unit LM 28 will be the default LM. Otherwise, the current remote unit LM 28 is the LM that was most recently set by the Link Mode adjuster 38 as described below.

A digital signal processor 34 within the remote unit 20 determines a channel quality, for example a signal to interference ratio of the signal. The channel quality may also be assessed by observing the error rate of the received data. The digital signal processor 34 may determine the error rate from the decoder 26 for the error correcting codes and provide this information to the Link Mode evaluator 36. A Link Mode evaluator 36 within the remote unit 20 determines a desired LM from amongst the allowed LMs stored in the table 32. The Link Mode evaluator 36 is a processor, which may be part of a larger processor. The desired LM will depend on the channel quality and on other parameters such as capabilities of the base station. For example, the Link Mode evaluator 36 will select a LM which allows a maximum transmission rate while still maintaining an acceptable bit error rate for a measured signal to interference ratio. Referring to FIG. 2, an example of a table of allowed LMs is shown. The values in FIG. 2 correspond to a Gaussian channel with an acceptable bit error rate of $2\times10^{-4}$. If the digital signal processor 34 determines that the signal to interference ratio is 10 dB, then the Link Mode evaluator 36 determines from the table 32 that a modulation of QPSK and a coding rate of 7/8 are needed. Entries in the table shown in FIG. 2. are for example purposes only, and actual values will depend on requirements of the radio communication system.

Returning to FIG. 1, a Link Mode adjuster 38 within the remote unit 20 compares the desired LM with the current remote unit LM 28, and determines a sequential difference between the desired LM and the current remote unit LM 28. The Link Mode adjuster 38 is a processor, and may be part of a larger processor such as the Link Mode evaluator. The sequential difference indicates a difference in sequential positions between the desired LM and the current remote unit LM within the table 32 of allowed LMs. Using the example LMs of FIG. 2, if the current remote unit LM is a modulation of 16-QAM and a coding rate of 2/3, and the desired LM is a modulation of QPSK and a coding rate of 7/8, then the sequential difference determined by the Link Mode adjuster 38 has a value of "−1" because the desired LM has a sequential position one less than that of the current remote unit LM within the table 32. In this example, the channel quality determined by the digital signal processor 34 has deteriorated to the point that a lower modulation level is needed to maintain a desired bit error rate. As another example using the same current remote unit LM, if the Link Mode evaluator 36 determines that the desired LM is a modulation of 64-QAM and a coding rate of 1/2, then the sequential difference determined by the Link Mode adjuster 38 has a value of "2" because the desired LM has a sequential position two greater than that of the current remote unit LM. In this example, the channel quality determined by the digital signal processor 34 has improved to the point that a higher modulation level can be used to increase the transmission rate, while still maintaining the desired bit error rate.

The remote unit 20 transmits return signal 42 along a reverse link to the base station 10 through a remote unit transmitting antenna 40, which may or may not be the same antenna as the remote unit receiving antenna 24. The return signal 42 includes the sequential difference. In low mobility systems the channel quality will vary slowly and the sequential difference will have a low value, the desired LM frequently being only one sequential position away from the current remote unit LM. The remote unit 20 therefore has relatively little data to send to the base station 10 concerning which LM to use. After a delay sufficient to allow for the propagation of the return signal to the base station 10 and for the propagation of frames encoded using the desired LM from the base station 10 to the receiver 20, the Link Mode adjuster 38 sets the current remote unit LM 28 to be the desired LM. Meanwhile, the return signal 42 is received at the base station 10 at a base station receiving antenna 44, which may or may not be the same antenna as the base station transmitting antenna 14. A Link Mode adjuster 46 within the base station 10 compares the sequential difference and the current base station LM to determine the desired LM from the table 18 of allowed LMs, and sets the current base station LM 16 to be the desired LM. Alternatively, if the current base station LM 16 is stored as an index to the table 18, then the Link Mode adjuster 46 can simply adjust the value of the stored index by the value of the sequential difference. The delay in adjusting the current remote unit LM 28 ensures that the current base station LM 16 and the current remote unit LM 28 are synchronized.

If at some point a mismatch arises between the current base station LM 16 and the current remote unit LM 28, the mismatch will continue because the remote unit 20 is only sending the sequential difference determined by the Link Mode adjuster 38. Such a mismatch may result, for example, from an undetected error during transmission of the return signal 42. To correct for mismatches between the two current LMs, the remote unit 20 may also occasionally send the desired LM, determined by the Link Mode evaluator 36, to the base station 10. If the base station 10 receives the desired LM rather than a sequential difference, then the Link Mode adjuster 46 sets the current base station LM 16 to be the desired LM, rather than adjusting the current base station LM 16 using the sequential difference. Little signalling is required, as the desired LM is one of the allowed LMs stored in the tables 32 and 18, and only an index to the table needs to be included in the return signal 42.

Figure 3:
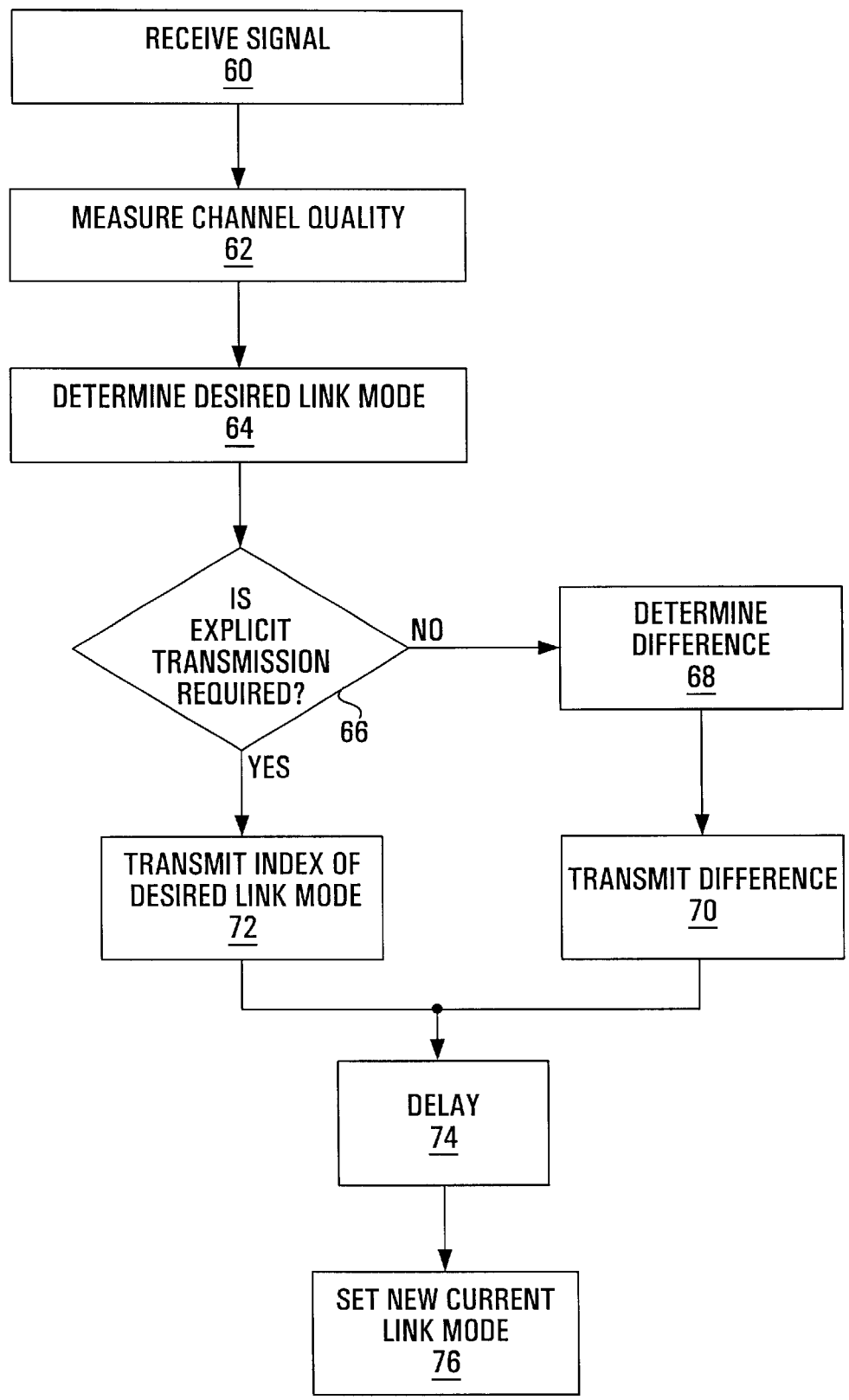
FIG. 3 is a flow chart showing the method carried out by a remote unit.

Referring to FIG. 3, a method by which the remote unit determines and conveys the desired LM to the base station is shown. At step 60 the remote unit receives the signal 12. The channel quality, for example the signal to interference ratio, is measured at step 62. Using the channel quality and system parameters such as an acceptable bit error rate, the desired LM is determined at step 64. At step 66 the remote unit determines whether the sequential difference between the desired LM and the current remote unit LM is to be transmitted, or whether an index to the desired LM is to be transmitted. The decision at step 66 is based on a predefined condition, for example whether a preset multiple of transmissions have occurred. For example, the remote unit may transmit the index to the desired LM every tenth transmission. If at step 66 the remote unit determines that the index to the desired LM is to be transmitted, then at step 72 the remote unit transmits the index to the desired LM as part of a return signal. The return signal may also include a flag consisting of a single bit to indicate that the information in the return signal concerning the desired LM is an index to the desired LM rather than a sequential difference. After a delay 74 sufficient to allow propagation of the return signal to the base station and propagation of a signal encoded using the desired LM from the base station to the remote unit, the remote unit sets the current remote unit LM to be the desired LM. If the remote unit is not intended to periodically transmit the index to the desired LM, then step 66 can be set to be always false. Alternatively, steps 66 and 72 can be removed altogether, with step 68 following step 64.

If at step 66 the remote unit determines that the index to the desired LM is not to be transmitted, then at step 68 the remote unit compares the sequential position of the current remote unit LM with the sequential position of the desired LM to determine the sequential difference between the two LMs within the table 32 of allowed LMs. At step 70 the remote unit transmits the sequential difference as part of a return signal. After a delay 74 sufficient to allow propagation of the return signal to the base station and propagation of a signal encoded using the desired LM from the base station to the remote unit, the remote unit sets the new current remote unit LM by adjusting the current remote unit LM by the sequential difference at step 76.

Figure 4:
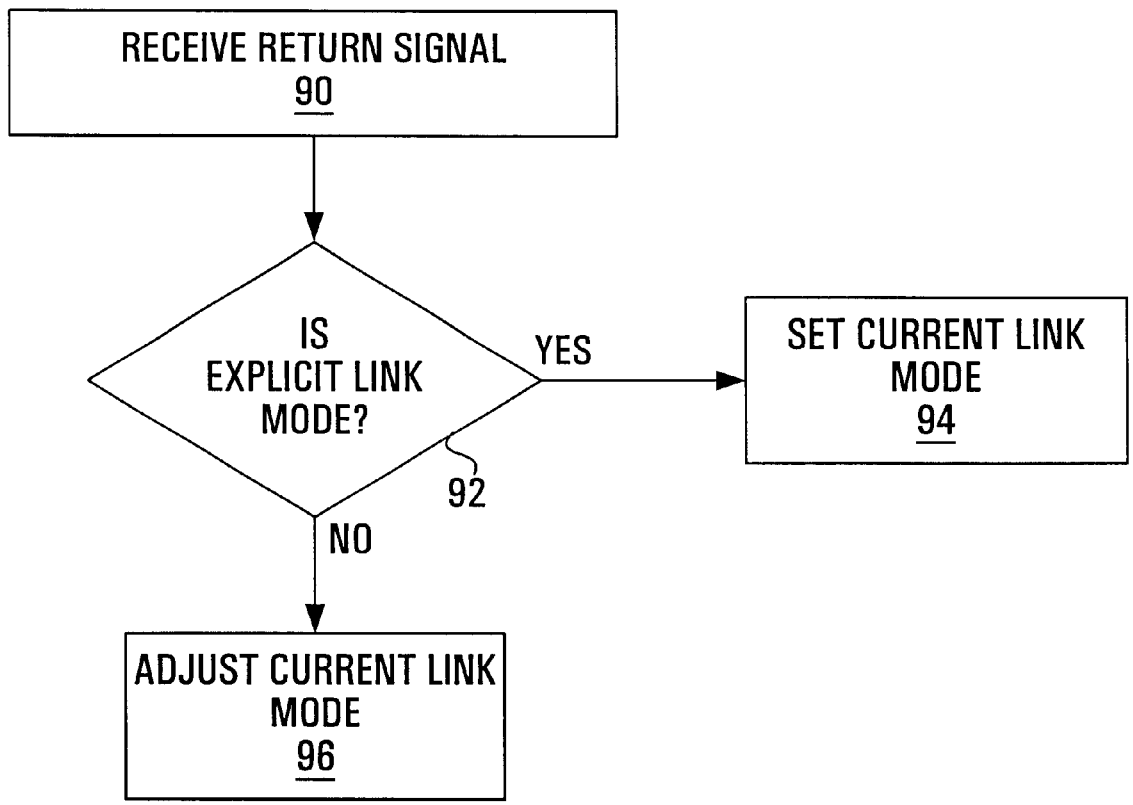
FIG. 4 is a flow chart showing the method carried out by a base station.

Referring to FIG. 4, a method by which the base station adjusts the current base station LM 16 is shown. The base station receives a return signal from the remote unit at step 90. At step 92 the base station determines the value of the flag in the return signal to determine whether the return signal includes an index to the desired LM or a sequential difference. If the flag indicates that the return signal includes an index to the desired LM, then at step 94 the base station sets the current base station LM to be the LM referred to by the index. If at step 92 the flag indicates that the return signal includes a sequential difference, then at step 96 the base station adjusts the current base station LM to be the desired LM by locating the desired LM within the table of allowed LMs using the sequential difference. Alternatively, if the current base station LM is stored as an index to the table 18 of allowed LMs, then at step 96 the base station adjusts the value of the index by the sequential difference.

An alternative method of synchronizing the Link Modes may be used if the frame of data transmitted from the base station to the remote unit contains numbered packets. Rather than waiting for a delay at step 74, the remote unit selects a packet number which will arrive at the remote unit after propagation of the return signal to the base station and propagation of a signal encoded using the desired LM from the base station to the remote unit. The packet having the selected packet number will be the last packet transmitted using the current LM. The return signal includes the packet number. Once the base station has transmitted the packet identified by the packet number, the base station sets the current base station LM to be the desired LM and all subsequent packets will be encoded using the desired LM. Similarly, the remote unit continues decoding packets using the current LM until it receives and decodes the packet identified by the packet number, at which time the remote unit sets the current remote unit LM to be the desired LM and all subsequent packets are decoded using the desired LM.

The invention is particularly suited to systems with many sub-carriers, such as systems that employ Orthogonal Frequency Division Multiplexing. If the base station transmits signals along multiple sub-carriers, a current remote unit LM 28 is stored for each sub-carrier. A channel quality is determined for each sub-carrier at step 62, a desired LM is determined for each sub-carrier at step 64, a difference is calculated for each sub-carrier at step 68, and a difference for each sub-carrier is transmitted to the base station at step 70. The current remote unit LM 28 for each sub-carrier is adjusted at step 76, and the current base station LM 16 for each sub-carrier is adjusted at step 96. The transmission of a difference for each sub-carrier rather than of a channel quality for each sub-carrier saves significant overhead, as does the elimination of the need for the base station to transmit a LM to the remote unit for each sub-carrier. To correct for possible mismatches between the current remote unit LMs and the current base station LMs, the remote unit may periodically transmit the desired LM for one or more sub-carriers. Further overhead can be saved if a desired LM is determined for each of a plurality of groups of sub-carriers at step 64. A difference is then calculated for each group at step 68, and the difference for each group is transmitted to the base station at step 70. Sub-carriers having carrier frequencies close to each other will usually have similar channel qualities, so calculating a desired LM for a group of adjacent sub-carriers will usually result in an optimum LM for each sub-carrier in the group. The groups of sub-carriers can therefore be defined by sub-carriers having contiguous sub-band numbers.

Figure 5:
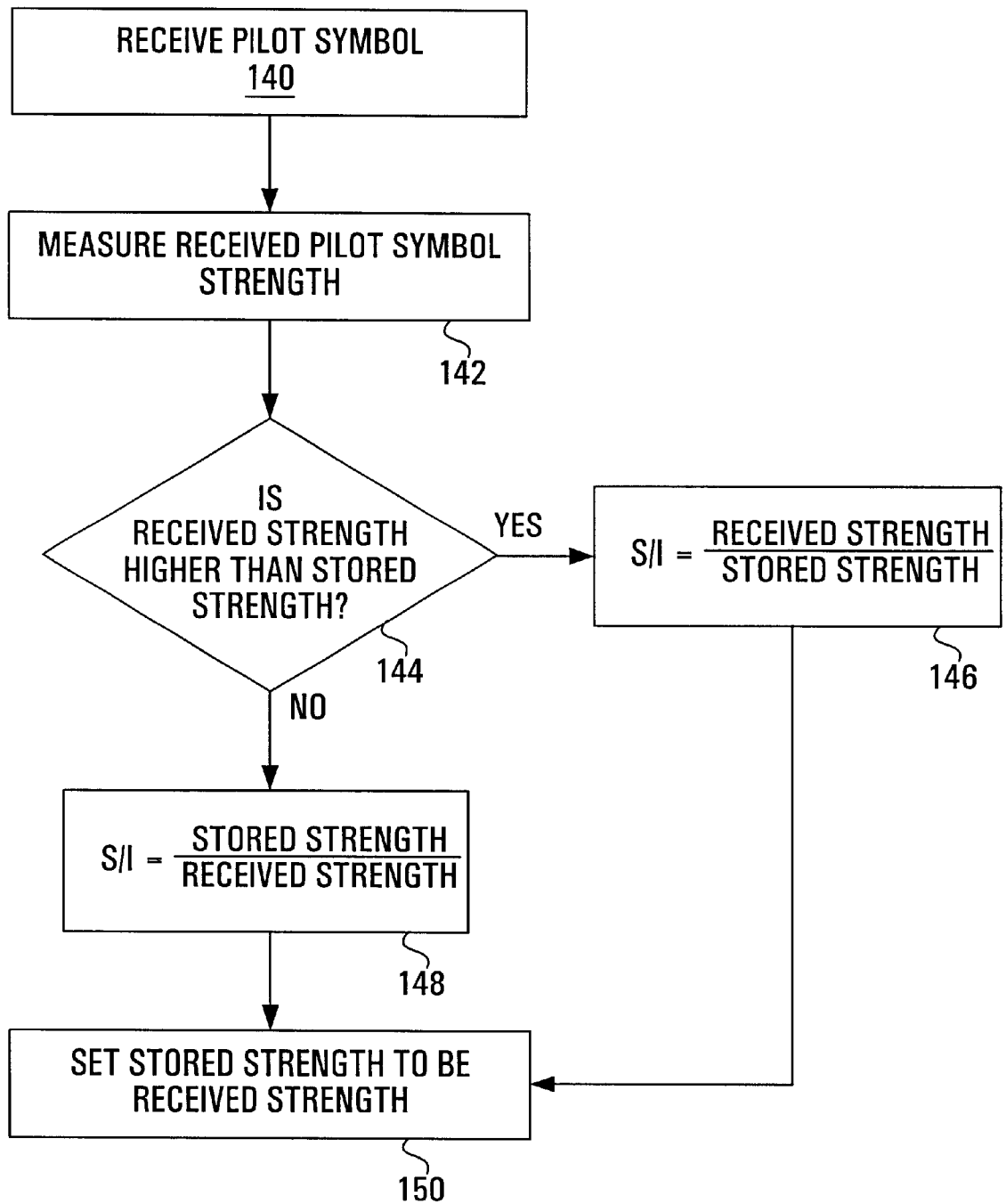
FIG. 5 is a flow chart showing the method of determining a signal to interference ratio by blinking a pilot signal.

A blinking pilot signal provides one method by which the digital signal processor 34 may determine the signal to interference ratio. The base station transmits a pilot signal on some sub-carriers, referred to as pilot sub-carriers, and regular traffic on other sub-carriers, referred to as signal sub-carriers. The base station turns the pilot signal on and off in successive symbols in one or more of the pilot sub-carriers. Referring to FIG. 5, a method by which the digital signal processor 34 determines the signal to interference ratio of a pilot sub-carrier is shown. The digital signal processor receives a received pilot symbol on the pilot sub-carrier at step 140. The digital signal processor measures a signal strength of the received pilot symbol at step 142. At step 144 the digital signal processor determines whether the received pilot symbol corresponds to a pilot signal which is turned on or to a pilot signal which is turned off. The digital signal processor stores a stored signal strength of a previous pilot symbol, which was received immediately before the received pilot symbol. If at step 144 the signal strength of the received pilot symbol is higher than the stored signal strength, then the pilot signal has just been turned on and the signal strength of the received pilot symbol indicates a strength of a carrier signal of the pilot sub-carrier. At step 146 the digital signal processor calculates the signal to interference ratio as a ratio of the signal strength of the received pilot symbol to the stored signal strength. If at step 144 the digital signal processor determines that the signal strength of the received pilot symbol is not higher than the stored signal strength, then the pilot symbol has just been turned off and the signal strength of the received pilot symbol indicates a level of interference within the pilot sub-carrier. At step 148 the digital signal processor calculates the signal to interference ratio as a ratio of the stored signal strength to the signal strength of the received pilot symbol. After calculating the signal to interference ratio for the pilot sub-carrier, the digital signal processor stores the signal strength of the received pilot symbol as the stored signal strength at step 150 for use when another pilot symbol is received. The signal to interference ratio calculated in this way is actually a signal-plus-interference to interference ratio, but as the signal is typically much stronger than the interference, this is a suitable approximation to the signal to interference ratio.

In order to obtain a smoother estimate of the signal to interference ratio, the signal to interference ratio can be measured over more than two pilot symbols. For example, the digital signal processor may store a queue of signal strengths of three previous symbols. The signal to interference ratio is then calculated as the ratio of the signal strengths of two symbols corresponding to the pilot signal which is turned on to the signal strengths of two symbols corresponding to the pilot signal which is turned off.

Figure 6:
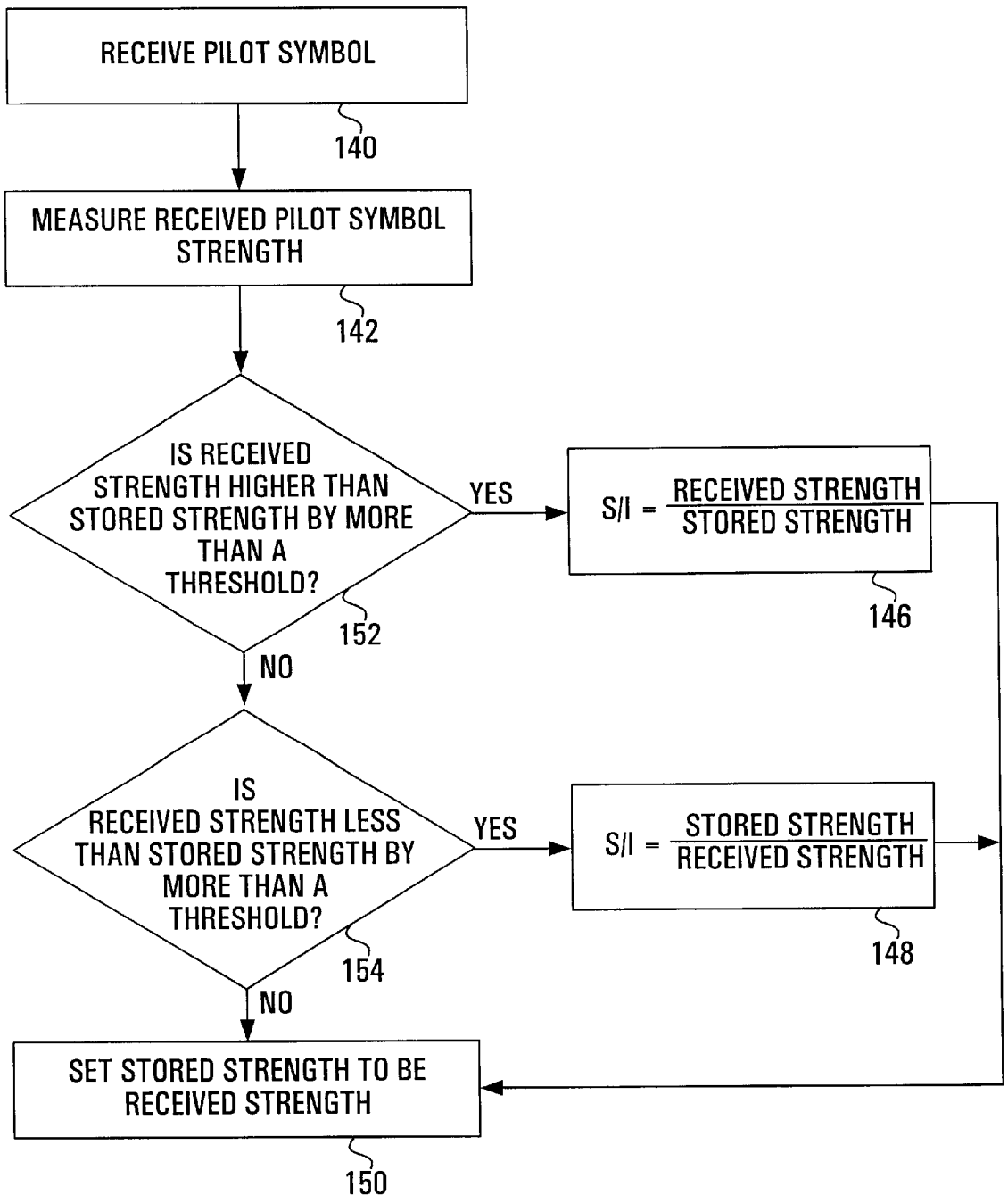
FIG. 6 is a flow chart showing an alternate method of determining a signal to interference ratio by blinking a pilot signal.

Rather than turning a pilot signal on and off in successive symbols, the base station may transmit a sequence of symbols which are turned on followed by a sequence of symbols which are turned off. The sequence of symbols which are turned on may have a different number of symbols than the sequence of symbols which are turned off. In such a case, the digital signal processor determines the signal to interference ratio using a method as shown in FIG. 6. The method of FIG. 6 is similar to that shown in FIG. 5, except that step 144 is replaced by steps 152 and 154. If the digital signal processor determines at step 152 that the signal strength of the received pilot symbol is higher than the stored signal strength by more than a threshold, then the pilot symbol has just been turned on and the signal strength of the received pilot symbol indicates a level of interference within the pilot sub-carrier. If the digital signal processor determines at step 154 that the signal strength of the received pilot symbol is less than the stored signal strength by more than a threshold, then the pilot symbol has just been turned off and the signal strength of the received pilot symbol indicates a strength of a carrier signal of the pilot sub-carrier. If neither of these conditions (at step 152 and 154) are found to be true, then the signal strength of the received pilot symbol is within the threshold of the stored signal strength, and there has been no change in whether the pilot signal is off or on. Even in such a case, the stored signal strength is set to be the received signal strength at step 150 to ensure that the most recent received signal strength is being stored.

The signal to interference ratio calculated for a pilot sub-carrier can be used to indicate the channel quality in neighbouring signal sub-carriers, which have a frequency close to that of the pilot sub-carrier. Not all pilot signals will need to be blinked in all circumstances. The nature of the interference will dictate by how much the interference varies across the sub-carriers. For example, if the interference arises mainly from similar communication systems operating in adjacent channels, there may be little variation in the interference across the sub-carriers. In such a case, it may be sufficient to blink only half of the pilot signals in order for the digital signal processor to estimate the signal to interference ratio for all sub-carriers. This method of determining the signal to interference ratio for a sub-carrier can also be used for purposes other than adapting a LM.

What has been described is merely illustrative of the application of the principles of the invention. Other arrangements and methods can be implemented by those skilled in the art without departing from the spirit and scope of the present invention. For example, the allowed LMs stored at the base station and at the remote unit have been described as being stored in tables. Any method of storing the allowed LMs as a sequence can be used, such as a linked list, as long as each LM has a sequential position and a sequential difference between the desired LM and the current remote unit LM can be unambiguously determined and communicated from the remote unit to the base station. In addition, each processor described above may be any computing apparatus containing logic for executing the described functionality. For example, any of the processors may be a single processor, more than one processor, or a component of a larger processor. The logic may comprise external instructions or internal circuitry.

We claim:

1. A method of adapting a current Link Mode (LM) in a radio communication system, a LM being a set of at least one transmission parameter, the communication system including a base station which transmits a signal to a remote unit using the current LM, the method comprising the steps of:

storing a sequence of allowed LMs at the base station and at the remote unit, each LM having a sequential position within the sequence;

at the remote unit, determining a channel quality of the signal;

at the remote unit, determining a desired LM from amongst the sequence of allowed LMs based on the channel quality;

at the remote unit, determining a sequential difference defined as a difference between the sequential position of the current LM and the sequential position of the desired LM;

transmitting the sequential difference from the remote unit to the base station;

at the remote unit, setting a new current LM to be the desired LM; and at the base station, setting the new current LM using the sequential difference.

2. The method of claim 1 further comprising the step of transmitting the desired LM from the remote unit to the base station if a predefined condition is met.

3. The method of claim 1 wherein the channel quality is a signal to interference ratio.

4. The method of claim 1 wherein the channel quality is determined from the transmission error rate.

5. The method of claim 1 wherein the at least one transmission parameter includes a modulation scheme.

6. The method of claim 1 wherein the at least one transmission parameter includes a coding rate.

7. The method of claim 6 wherein the at least one transmission parameter includes a modulation scheme.

8. The method of claim 1 wherein the at least one transmission parameter includes antenna directional coefficients.

9. The method of claim 1 wherein the at least one transmission parameter includes space-time coding coefficients for multiple antenna systems.

10. The method of claim 1 wherein the signal is transmitted over a plurality of sub-carriers, each sub-carrier belonging to one of a plurality of groups of sub-carriers, each group of sub-carriers having a current LM, and wherein:

the step of determining a channel quality determines a channel quality for each sub-carrier the step of determining a desired LM determines a desired LM for at least one group of sub-carriers;

the step of determining a sequential difference determines a sequential difference for at least one group of sub-carriers;

the step of transmitting the sequential difference transmits a sequential difference for at least one group of sub-carriers;

the step of setting a new current LM at the remote unit sets a new current LM for at least one group of sub-carriers; and the step of setting a new current LM at the base station sets a new current LM for at last one group of sub-carriers.

11. The method of claim 10 further comprising the step of transmitting the desired LM for at least one group of sub-carriers from the remote unit to the base station if a predefined condition is met.

12. The method of claim 10 wherein the channel quality of each sub-carrier is a signal to interference ratio.

13. The method of claim 12 wherein the base station transmits a pilot signal over at least one pilot sub-carrier such that the pilot signal is either on or off, the pilot sub-carrier having a signal strength when it is received by the remote unit and a carrier frequency, and the step of determining the signal to interference ratio of a sub-carrier having a carrier frequency closer to the carrier frequency of the pilot sub-carrier than to a carrier frequency of any other pilot sub-carrier calculates a ratio of the signal strength when the pilot signal is on to the signal strength when the pilot signal is off.

14. The method of claim 13 wherein the communication system employs Orthogonal Frequency Division Multiplexing.

15. The method of claim 10 wherein each group of sub-carriers contains sub-carriers having contiguous sub-band numbers.

16. The method of claim 10 wherein each group of sub-carriers contains a single sub-carrier.

17. The method of claim 10 wherein the at least one transmission parameter includes a modulation scheme.

18. The method of claim 10 wherein the at least one transmission parameter includes a coding rate.

19. The method of claim 18 wherein the at least one transmission parameter includes a modulation scheme.

20. The method of claim 10 wherein the communication system employs Orthogonal Frequency Division Multiplexing.

21. The method of claim 1 comprising the further steps of:

at the remote unit, selecting a packet number of a packet which will arrive at the remote unit after propagation of a return signal to the base station and propagation of a signal to the remote unit; and transmitting the selected packet number from the remote unit to the base station; and wherein the step of setting a new current LM at the remote unit sets a new current LM once the remote unit receives a packet identified by the selected packet number, and wherein the step of setting a new current LM at the base station sets a new current LM once the base station transmits a packet identified by the selected packet number.

22. A remote unit for a radio communication system, the remote unit including a decoder which decodes a signal received from a base station using a current Link Mode (LM), a LM being a set of at least one transmission parameter, and the remote unit comprising:

means for storing a sequence of allowed LMs, each LM having a sequential position within the sequence;

means for determining a channel quality of the signal;

means for determining a desired LM from amongst the sequence of allowed LMs based on the channel quality;

means for determining a sequential difference defined as a difference between the sequential position of the current LM and the sequential position of the desired LM;

means for transmitting the sequential difference to the base station; and means for setting a new current LM to be the desired LM.

23. The remote unit of claim 22 further comprising means for transmitting the desired LM to the base station in the event that a predefined condition is met.

24. The remote unit of claim 22 wherein the channel quality is a signal to interference ratio.

25. The remote unit of claim 22 wherein the at least one transmission parameter includes a modulation scheme.

26. The remote unit of claim 22 wherein the at least one transmission parameter includes a coding rate.

27. The remote unit of claim 26 wherein the at least one transmission parameter includes a modulation scheme.

28. The remote unit of claim 22 wherein the signal is received over a plurality of sub-carriers, each sub-carrier belonging to one of a plurality of groups of sub-carriers, each group of sub-carriers having a current LM, and wherein:

the means for determining a channel quality comprise means for determining a channel quality for each sub-carrier;

the means for determining a desired LM comprise means for determining a desired LM for at least one group of sub-carriers the means for determining a sequential difference comprise means for determining a sequential difference for at least one group of sub-carriers;

the means for transmitting the sequential difference comprise means for transmitting a sequential difference for at least one group of sub-carriers; and the means for setting a new current LM comprise means for setting a new current LM for at least one group of sub-carriers.

29. The remote unit of claim 28 further comprising means for transmitting the desired LM for at least one group of sub-carriers in the event that a predefined condition is met.

30. The remote unit of claim 28 wherein the channel quality of each sub-carrier is a signal to interference ratio.

31. The remote unit of claim 30 wherein at least one sub-carrier is a pilot sub-carrier which carries a pilot signal, the pilot signal being either on or off, the pilot sub-carrier having a signal strength when it is received by the remote unit and a carrier frequency, and the means for determining a signal to interference ratio of a sub-carrier having a carrier frequency closer to the carrier frequency of the pilot sub-carrier than to a carrier frequency of any other pilot sub-carrier comprise means for calculating a ratio of the signal strength when the pilot signal is on to the signal strength when the pilot signal is off.

32. The remote unit of claim 31 wherein the communication system employs Orthogonal Frequency Division Multiplexing.

33. The remote unit of claim 28 wherein each group of sub-carriers contains sub-carriers having contiguous sub-band numbers.

34. The remote unit of claim 28 wherein each group of sub-carriers contains a single sub-carrier.

35. The remote unit of claim 28 wherein the at least one transmission parameter includes a modulation scheme.

36. The remote unit of claim 28 herein the at least one transmission parameter includes a coding rate.

37. The remote unit of claim 36 wherein the at least one transmission parameter includes a modulation scheme.

38. The remote unit of claim 28 wherein the communication system employs Orthogonal Frequency Division Multiplexing.

39. A base station for a radio communication system, the base station transmitting a signal to a remote unit using a current Link Mode (LM), a LM being a set of at least one transmission parameter, the base station comprising:

means for maintaining a sequence of allowed LMs, each LM having a sequential position within the sequence;

means for receiving from the remote unit a sequential difference defined as a difference between the sequential position of the current LM and the sequential position of a desired LM, the desired LM belonging to the sequence of allowed LMs; and means for setting a new current LM using the sequential difference.

40. The base station of claim 39 further comprising means for setting a new current LM to be equal to the desired LM in the event that the base station receives the desired LM from the remote unit.

41. The base station of claim 39 wherein the at least one transmission parameter includes a modulation scheme.

42. The base station of claim 39 wherein the at least one transmission parameter includes a coding rate.

43. The base station of claim 42 wherein the at least one transmission parameter includes a modulation scheme.

44. The base station of claim 39 wherein the signal is transmitted over a plurality of sub-carriers, each sub-carrier belonging to one of a plurality of groups of sub-carriers, each group of sub-carriers having a current LM, and wherein:

the means for receiving a sequential difference comprise means for receiving a sequential difference for at least one group of sub-carriers; and the means for setting a new current LM comprise means for setting a new current LM for at least one group of sub-carriers using the sequential difference for that group of sub-carriers.

45. The base station of claim 44 wherein each group of sub-carriers contains sub-carriers having contiguous sub-band numbers.

46. The base station of claim 44 wherein each group of sub-carriers contains a single sub-carrier.

47. The base station of claim 44 wherein the base station transmits a pilot signal over at least one sub-carrier such that the pilot signal is either on or off.

48. The base station of claim 47 wherein the communication system employs Orthogonal Frequency Division Multiplexing.

49. The base station of claim 44 further comprising:

means for setting a new current LM for at least one group of sub-carriers to be equal to a desired LM for that group of sub-carriers in the event that the base station receives the desired LM for that group of sub-carriers.

50. The base station of claim 44 wherein the at least one transmission parameter includes a modulation scheme.

51. The base station of claim 44 wherein the at least one transmission parameter includes a coding rate.

52. The base station of claim 51 wherein the at least one transmission parameter includes a modulation scheme.

53. The base station of claim 44 wherein the communication system employs Orthogonal Frequency Division Multiplexing.

* * * * *

UNITED STATES PATENT AND TRADEMARK OFFICE
CERTIFICATE OF CORRECTION

PATENT NO. : 6,701,129 B1 Page 1 of 1
DATED : March 2, 2004
INVENTOR(S) : Bassam Hashem et al.

It is certified that error appears in the above-identified patent and that said Letters Patent is hereby corrected as shown below:

Column 9,
Lines 41-44, this should be two sub-paragraphs reading as:
-- the step of determining a channel quality determines a channel quality for each sub-carrier;
the step of … group of sub-carriers; --.
Line 56, "…last…." should read -- …least… --

Column 11,
Line 9, there should be a semi-colon ";" after "…sub-carriers…"

Signed and Sealed this

Ninth Day of November, 2004

JON W. DUDAS
*Director of the United States Patent and Trademark Office*